(12) United States Patent
Kelly (10) Patent No.: US 10,769,509 B2
(45) Date of Patent: Sep. 8, 2020

(54) DETERMINING AN ACTION ASSOCIATED WITH AN APPARATUS USING A COMBINED BAR CODE IMAGE

(71) Applicant: KONINKLIJKE PHILIPS N.V., Eindhoven (NL)

(72) Inventor: Declan Patrick Kelly, Shanghai (CN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 16/442,641

(22) Filed: Jun. 17, 2019

(65) Prior Publication Data

US 2019/0303735 A1 Oct. 3, 2019

Related U.S. Application Data

(63) Continuation of application No. 15/774,419, filed as application No. PCT/EP2016/077509 on Nov. 11, 2016, now Pat. No. 10,331,988.

(30) Foreign Application Priority Data

Nov. 13, 2015 (WO) ................ PCT/CN2015/094522
Jan. 4, 2016 (EP) .................................... 16150050

(51) Int. Cl.
G06K 19/06 (2006.01)
G06K 7/10 (2006.01)
G06K 7/14 (2006.01)
G05B 19/12 (2006.01)

(52) U.S. Cl.
CPC ..... *G06K 19/06103* (2013.01); *G05B 19/124* (2013.01); *G06K 7/10722* (2013.01); *G06K 7/1413* (2013.01); *G06K 7/1417* (2013.01); *G05B 2219/25366* (2013.01)

(58) Field of Classification Search
CPC ............... G06K 7/1413; G06K 7/1417; G06K 7/10722; G06K 19/06103; G05B 19/124; G05B 2219/25366
See application file for complete search history.

(56) References Cited

U.S. PATENT DOCUMENTS

| 8,215,565 | B2 | 7/2012 | Howard |
| 8,308,060 | B2 | 11/2012 | Wilds |
| 2002/0093555 | A1 | 7/2002 | Kobayashi |
| 2005/0109846 | A1 | 5/2005 | Lubow |
| 2006/0015534 | A1 | 1/2006 | Takahashi |

(Continued)

FOREIGN PATENT DOCUMENTS

| CN | 104751109 | 7/2015 |
| CN | 104922965 | 9/2015 |

(Continued)

OTHER PUBLICATIONS

Panyavaraporn, Jantana, Horkaew, Paramate, and Wongtrairat, Wannaree, "QR code watermarking algorithm based on wavelet transform", pp. 791-796, Sep. 2013.

*Primary Examiner* — Laura A Gudorf (57) ABSTRACT

The present application relates to a method of determining an action associated with an apparatus. The method comprises obtaining (100) data representing a visual code and a visual symbol; comparing (120) the visual code with a reference code, and comparing (130) the visual symbol with a reference symbol, to obtain comparison results; and determining (140) the action in response to the comparison results.

21 Claims, 3 Drawing Sheets

(56) References Cited

U.S. PATENT DOCUMENTS

| | | |
|---|---|---|
| 2008/0296362 A1 | 12/2008 | Lubow |
| 2009/0255992 A1 | 10/2009 | Shen |
| 2010/0102076 A1 | 4/2010 | Hendrickson |
| 2014/0326792 A1 | 11/2014 | Sakahashi |

FOREIGN PATENT DOCUMENTS

| | | |
|---|---|---|
| EP | 2180390 A2 | 4/2010 |
| JP | 11296647 A | 10/1999 |
| JP | 2004140823 A | 5/2004 |
| WO | 2014104694 A1 | 7/2014 |
| WO | 2015067725 A1 | 5/2015 |

FIG. 4

DETERMINING AN ACTION ASSOCIATED WITH AN APPARATUS USING A COMBINED BAR CODE IMAGE

This application is a Continuation of U.S. application Ser. No. 15/774,419 filed May 8, 2018, which is the U.S. National Phase application under 35 U.S.C. § 371 of International Application No. PCT/EP2016/077509, filed on Nov. 11, 2016, which claims the benefit of International Application No. PCT/CN2015/094522 filed on Nov. 13, 2015 and International Application No. 16150050.9 filed on Jan. 4, 2016. These applications are hereby incorporated by reference herein.

FIELD OF THE INVENTION

The present invention relates in general to the field of determining an action associated with an apparatus, and more particularly relates to determining an action associated with an apparatus with a disposable component.

BACKGROUND OF THE INVENTION

Nowadays, smart control is very popular. For example, using an App installed in a smartphone to remotely control an apparatus, for example, an air purifier, an air conditioner, etc. The App is very convenient for a consumer to control their apparatus in advance before they arrive at home so as to make their home more comfortable or with better air quality when they go back home. The smart control may also be implemented in the apparatus locally according to some sensor readings. The control of the apparatus may comprise to switch on it, switch off it, to operate at a given operation mode.

Meanwhile, some of these apparatus comprise disposable components, for example, for an air purifier, the particle filter and gas filter needs to be replaced when it reaches its end of life or to be regenerated when it is fully loaded. The smart control in this case, may also related to provide service to the apparatus to monitor the status of its disposable component and indicating the remaining lifetime of the disposable component of the home appliances and indicating end of life of the disposable component.

SUMMARY OF THE INVENTION

However, since other company may also manufacture the same type of consumable/disposable component with different quality, if the consumer changes a disposable component manufactured by other company which is different with the original manufacturer of the disposable component, this may result in a problem that the smart control application may not be able to properly monitor the status of the disposable component and may not provide appropriate information on lifetime, end of life etc. since the life time, the quality and the performance of the disposable component from another company is unclear.

It is an object of the invention to provide an improved method and system for determining an action associated with an apparatus considering the disposable component may come from different manufacturers.

The invention is defined by the independent claims. The dependent claims define advantageous embodiments.

According to an embodiment of the present invention, there is provided a method of determining an action associated with an apparatus having a disposable component, the method comprising:

obtaining data representing a visual code and a visual symbol;

comparing the visual code with a reference code, the reference code indicating an identity of a disposable component of the apparatus, and comparing the visual symbol with a reference symbol, to obtain comparison results; and determining the action in response to the comparison results.

The data is obtained by means of a camera. The comparing is performed by means of a processor.

The camera may refer broadly to any light sensitive element or device configured for obtaining data representing a visual code and a visual symbol. It may in particular be configured for detecting, identifying, scanning or receiving a visual pattern, image, code or identifier for example.

The processor may be a processor comprised as part of a computer or computer system. The processor may be a standalone processor. The processor may be a component of the apparatus or may be a separately provided component.

Advantageously, the apparatus may comprise any one of: air purifier, coffee machine, respiratory drug delivery apparatus, printer, water purifier, a vacuum cleaner, a shaver, an electric toothbrush, an oxygen concentrator or any other home appliances with disposable component. The disposable component for the air purifier it is the filter of the air purifier; for a coffee machine it is the coffee powder pad of the coffee machine; for a respiratory drug delivery apparatus it is the drug to be delivered by the respiratory drug delivery apparatus; for a printer it is the cartridge of the printer; and for a water purifier it is the filter of the water purifier. It may also be a bag of a vacuum cleaner, a shaving head of a shaver, a toothbrush head of an electric toothbrush or a filter of an oxygen concentrator, etc.

The reference code indicates an identity of a disposable component of the apparatus.

Advantageously, the visual code is selected from group of one-dimensional barcode, two-dimensional code, and hologram.

Advantageously, the reference symbol comprises any one of characters, words, pattern, image, symbol or the combination thereof.

Advantageously, the reference symbol comprises any one of trademark or copyright item. This provides the advantage that somebody else than the trademark owner or copyright owner or a licensee is legally prevented from using the reference symbol on his non-genuine disposable, so that the trademark or copyright owner is able to ensure that the apparatus operates as designed.

Advantageously, the action comprising at least one of the following:

controlling the apparatus;

providing services associated with the apparatus.

Advantageously, when the visual code matches with the reference code and the visual symbol matches with the reference symbol, the control of the apparatus comprises at least one of:

switching on the apparatus;

adjusting operation parameters according to the property of the disposable component; and the providing of services comprises providing service related to the disposable component.

Advantageously, when the visual code matches with the reference code and the visual symbol does not match with the reference symbol, the control of the apparatus comprises at least one of:

preventing the apparatus from being switched on; and
preventing the component of the apparatus from being installed to the apparatus, and
the providing of services comprises providing a subset of services which does not comprise service related to the disposable component.

Advantageously, the service related to the disposable component comprising at least one of the following:
registering the disposable component on an application;
monitoring the working status of the disposable component;
indicating working status of the disposable component;
indicating property of the disposable component;
indicating maintenance requirement of the disposable component.

Advantageously, when the visual code does not matches with the reference code, the control of the apparatus comprises at least one of:
preventing the apparatus from being switched on; and
preventing the component of the apparatus from being installed to the apparatus; and
the providing of services comprises at least one of:
providing a subset of services which does not comprise service related to the disposable component, and
indicating a correct identity of the disposable component.

According to yet another embodiment of the present invention, there is provided a system for determining an action associated with an apparatus. The system comprises:
a camera for obtaining data representing a visual code and a visual symbol;
a processor arranged for comparing the visual code with a reference code, and comparing the visual symbol with a reference symbol, and determining the action in response to the comparison results.

According to yet another embodiment of the present invention, there is provided an apparatus having a disposable component. The apparatus comprises:
a camera for obtaining data representing a visual code and a visual symbol, wherein the visual code is selected from group of one-dimensional barcode, two-dimensional code, hologram; and
a processor arranged for comparing the visual code with a reference code, and comparing the visual symbol with a reference symbol, to obtain comparison results, wherein the reference code indicates an identity of the disposable component, the reference symbol comprises a trademark or a copyright item;
the processor being further arranged to determine an action associated with the apparatus in response to the comparison results.

According to yet another embodiment of the present invention, there is provided a system for determining an action associated with an apparatus. The system comprises:
means for obtaining data representing a visual code and a visual symbol;
means for comparing the visual code with a reference code, and comparing the visual symbol with a reference symbol, to obtain comparison results; and
means for determining the action in response to the comparison results.

According to yet another embodiment of the present invention, there is provided a computer readable medium carrying computer readable code for controlling a processor to carry out any one of the methods according one of the embodiments of the present invention.

An advantage of the invention is that the application used for control and/or providing service to the apparatus may be able to determine how to control the apparatus and/or which level of services can be delivered to the user of the apparatus depending on the disposable component replaced by the user. This may help to maintain a good performance of the apparatus and make sure reliable service provided to the user.

In one embodiment of the present invention, the application used for control and/or providing service to the apparatus is an App installed in a smartphone, in this case, since the smartphone already have all the hardware needed for performing the method of the invention, a further advantage is that the there is no hardware need to manage and control the user to replace the disposal component.

Advantageous embodiments of the controller, method and medium of the invention are formed by the above-mentioned embodiments of the system according to the invention. These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Various embodiments of the invention will now be described by means of the Figures.

Figure 1:
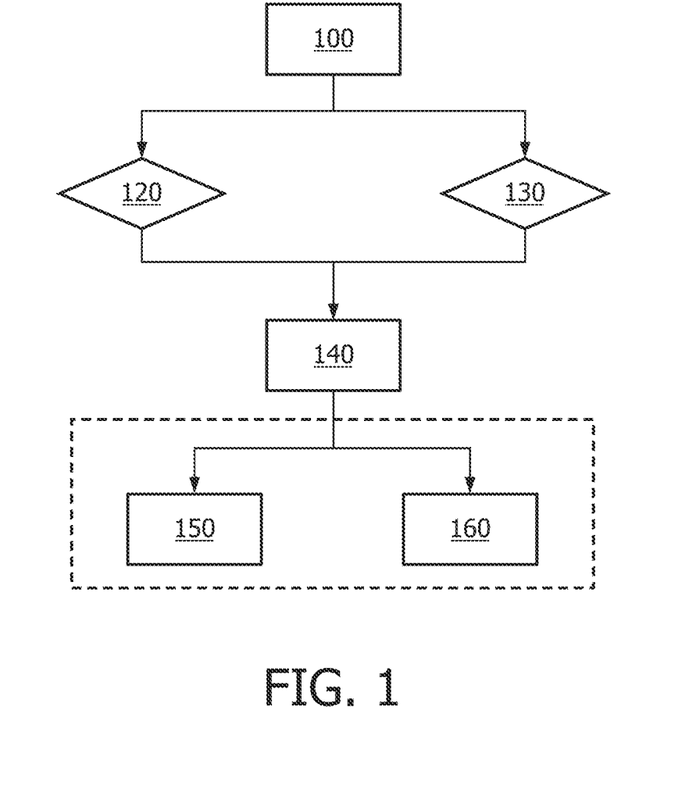
FIG. 1 shows a flow diagram of a method according to an embodiment of the invention.
Figure 2:
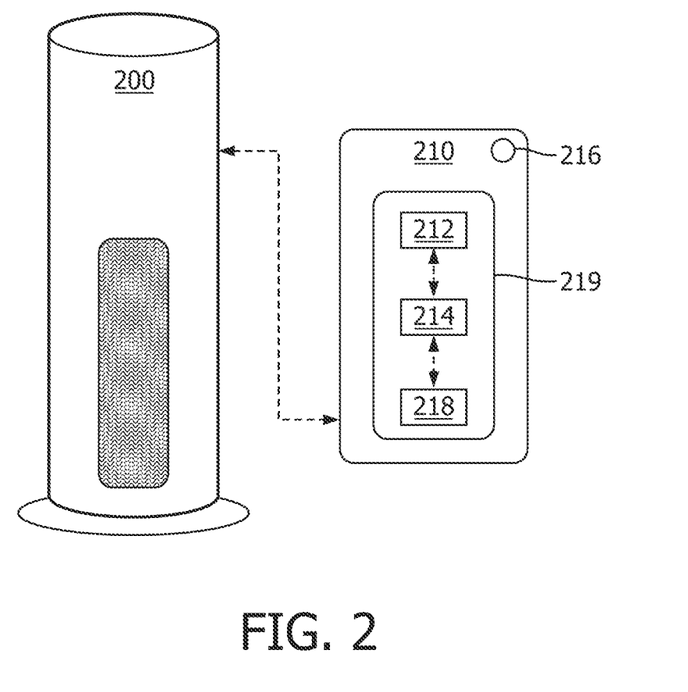
FIG. 2 shows a system enabling the implementation of the method according to an embodiment of the invention.

A method of determining an action to be performed by an application will now be described with reference to FIG. 1 and FIG. 2. FIG. 1 shows a flow diagram of a method according to an embodiment of the invention. FIG. 2 shows an example of a system for determining an action associated with an apparatus according to an embodiment of the invention. Although in the example of FIG. 2, the apparatus 200 is an air purifier, it is to be understood an apparatus may be any home appliances with a disposable component, for example, the apparatus may be an air purifier, a coffee machine, a respiratory drug delivery apparatus, a printer, a water purifier, a vacuum cleaner, a shaver, an electric toothbrush; an oxygen concentrator etc.

The disposable component of an air purifier may be a particle filter, a gas filter or a composite filter. The disposable component of a coffee machine may be a coffee powder pad used in the coffee machine. The disposable component of a respiratory drug delivery apparatus may be the drug used in the respiratory drug delivery apparatus. The disposable component of a printer may be a cartridge. The disposable component of a water purifier may be a filter used in the water purifier. The disposable component may also be a bag of a vacuum cleaner, a shaving head of a shaver, a toothbrush head of an electric toothbrush, or a filter of an oxygen concentrator.

In the example of FIG. 2, an application (App) is installed in a smartphone 210 for controlling the air purifier 200 and/or providing service associated with the air purifier 200 including services associated with the disposable component. The smartphone 210 also comprises a memory 212, a processor 214, a camera 216, a wireless transmission means 218 and a screen 219. In FIG. 2, the dashed block indicates invisible elements, for example, a memory 212, a processor 214, and wireless transmission means 218, which cannot be seen from outside. A dashed line with arrow indicates the signal being transmitted between the purifier 200 and the smartphone 210 via the wireless transmission means 218 of the smartphone and the wireless transmission means of the air purifier. The wireless transmission means 218 may use 2G, 3G, 4G telecommunication technologies, WiFi, Bluetooth, Zigbee, TCP/IP, or any other suitable technology for wireless communication.

When the user starts the App, and selects the air purifier 200 he wants to control or to obtain service associated with this air purifier. The App may first need to determine the actions and the services which are suitable to be provided to the user.

Therefore, a step 100 is performed for obtaining data representing a visual code and a visual symbol.

At step 120, the visual code is compared with a reference code.

Advantageously, the reference code indicates an identity of a disposable component of the apparatus.

The identity of the disposable component of the apparatus indicates a model number of the disposable component or indicates both model number and serial number of the disposable component. Serial number is a unique code e.g. a unique filter ID. If the identity of the disposable component comprises both model number and serial number, then only model number is compared with the reference code.

The visual code may be visible at a normal environment; alternatively it may only be visible under a special environment for example under an ultraviolet light or an infrared light. As examples of a visual code it may be any one of one-dimensional barcode (1D barcode), two-dimensional code (2D code), or 3D code. A 2D code, for example, may be a QR code. A 3D code, for example, may a hologram.

When the visual code matches with the reference code, it is indicated that the disposable component represented by the visual code is compatible with the apparatus. The term "match" in the context of this invention means that the model number represented by the visual code is identical with the reference code, or if a group of reference codes is pre-stored which means many model numbers are compatible with the apparatus, in this case, term "match" means the model number represented by the visual code is identical with one of a reference code from a group of reference codes.

Advantageously, the reference symbol may be a trademark or a copyright item owned by the original manufacturer of the apparatus or qualified manufacturer of the disposable component. The trademark or a copyright item may comprise any one of characters, words, pattern, image, symbol or any combination thereof. The App may pre-store a set of reference symbol; each reference symbol comprises a trademark or copyright item owned by a qualified manufacturer. A set of reference symbol indicates a set of qualified manufacturer respectively.

At step 130, the visual symbol is compared with the reference symbol. If the visual symbol matches with the reference symbol, it can be determined that the element represented by the visual symbol is made by the original manufacturer of the disposable component or a qualified manufacturer. In case there is pre-stored a set of reference symbols which indicates a set of qualified manufacturers, if the visual symbol matches with any one of the reference symbol, it indicates that the element represented by the visual symbol is made by a qualified manufacturer.

At step 140, one or more actions are determined in response to the comparison results. The action may be to control the apparatus and/or to provide services associated with the apparatus.

Advantageously, when the visual code matches with the reference code and the visual symbol matches with the reference symbol, the action may comprise switching on the apparatus and/or adjusting operation parameters according to the property of the disposable component. The action may also comprise to provide services related to the disposable component.

When the visual code matches with the reference code and the visual symbol does not match with the reference symbol, the determined action from controlling aspect may comprise at least one of:

preventing the apparatus from being switched on; and
preventing the component of the apparatus from being installed to the apparatus.

The determined action, from service providing aspect, may comprise provides a subset of services which does not comprise any service related to the disposable component.

The services related to the disposable component comprise at least one of the following (in other words, the services provided by the App will not include any one of following):

monitoring the working status of the disposable component;
indicating working status of the disposable component;
indicating property of the disposable component;
indicating maintenance requirement of the disposable component.

Optionally, after the action is determined by the App, the App may directly perform the determined action. When the App directly perform the determined action or actions, the method may further comprise a controlling step 150 for controlling the apparatus and a service providing step 160 for providing services associated with the apparatus. Since these two steps are optional steps, the block in FIG. 1 representing these two steps is put in a dashed block which means the steps in the dashed block is an optional steps.

Alternatively, after the action is determined by the App, the App may provide the determined action to the user via the display of the smartphone. This may give the user an option to choose another filter or insist to use the current filter in view of the intended control action to the apparatus and the service offered by the App.

In the example of FIG. 2, assuming the air purifier is made by Philips, and the App is also provided by Philips.

The App can control Philips air purifier from the user's smartphone remotely, such as: turn on/off, select different fan speeds, timer, scheduler, etc.

The App can provide services to the user, for example: provide outdoor air quality information from public data source via internet, receive indoor air quality information from the sensor of the air purifier, recommending the user to switch on or switch off the air purifier according to the real time outdoor and indoor air quality, these are general information and are air purifier related services, etc.

The App can also provide services related to the filter, for example, monitoring and indicating the working status of the filter (indicating how long it can still work, indicating when it reaches the end of life), indicating the property of the disposable component, and indicating maintenance requirement of the filter (some types of filter may be regenerated without change a new one).

In this example, when the App indicates to the user that the filter needs to be changed, normally the user will purchase a new filter and if the user still wants the App to provide service related to the new filter, the user need to register the new filter to the App and associate it with the air purifier so that the App may update the status of the filter with respect to the air purifier, and starts to monitor the status of the filter during its whole lifetime.

In this context, when the user starts the registration process, the App invokes the camera 216 for obtaining data representing a visual code and a visual symbol, the user needs to move the smartphone so that the camera can capture and scan a target area where the visual code and a visual symbol is located. This step is very similar with scanning a normal barcode using a smartphone.

The visual code and a visual symbol may be put anywhere as long as it is associated with the filter. For example, it may be printed on the outer surface of the filter or on the package of the filter. It may also be printed at a label affixed to the outer surface of the filter or on the package of the filter.

The visual code and a visual symbol may locate separately at different location. In this case, obtaining step may need to scan both locations to obtain the whole data. With two steps of scanning is not preferred, the visual symbol may be scanned from other sources instead of the disposable component, i.e. the system may easily be cheated.

Figure 3A:
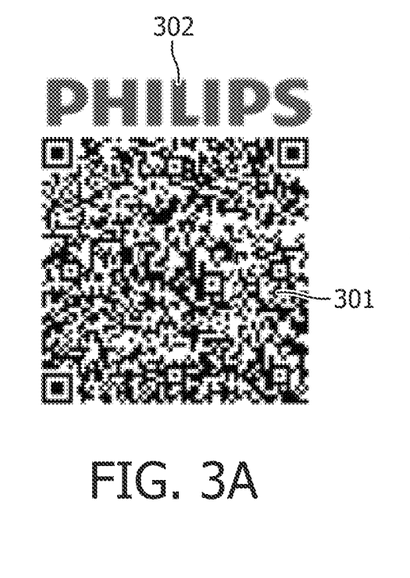
FIG. 3A and FIG. 3B show two examples of visual code and visual symbol according to an embodiment of the invention.
Figure 3B:
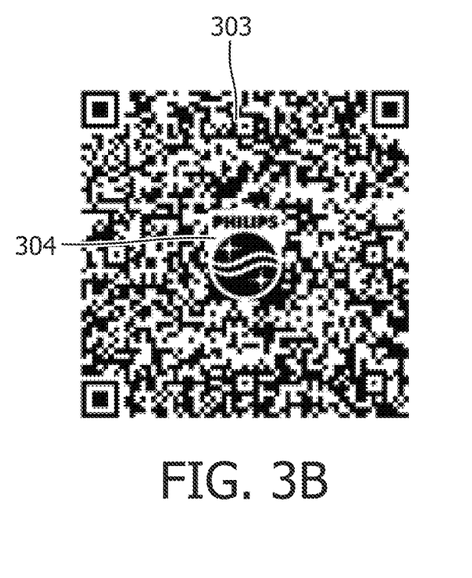

Preferably, the visual code and the visual symbol may be integrated into one pattern. As shown in FIG. 3, the visual code 301 and 303 is a QR code which represents the model number of the filter, and the visual symbol 302 and 304 is Philips' trademark. The visual code (QR code 301) and the visual symbol (Philips' trademark 302) may be arranged to be adjacent with each other as shown in FIG. 3A. Alternatively, the visual code (QR code 303) could surround the visual symbol (Philips' trademark 304) as shown in FIG. 3B. In case of latter example, the visual symbol 304 should be small enough to enable the visual code (QR code 303) to be readable.

The reference code and the reference symbol is pre-stored in the App or in a server or cloud and can be accessed by the App.

The reference code and the reference symbol could be pre-stored as an image comprising both visual code and the visual symbol which for example is identical with the image shown in FIG. 3A and FIG. 3B. The comparing step 120 and 130 may be performed by comparing the scanned image with a pre-stored image. In this case, the comparing step can be done by image comparison, the visual code does not need to be decoded.

Alternatively, the reference code and the reference symbol could be pre-stored separately. The reference code may be the model number of the filter i.e. the information carried by the visual code. The reference symbol is still an image of a trademark. In this case, the App may need to decode/translate the QR code into the numbers and/or characters and then determine whether the translated code is identical with the reference code, the visual symbol may still be compared with the reference symbol using imaging comparison technology.

To enhance the reliability of the comparing results, the size of the visual symbol may be compared with the reference symbol and relative location between the visual code and the visual symbol may also be compared with that of the reference code and the reference symbol.

The comparison may comprise below four different results:

1. The visual code matches with the reference code and the visual symbol matches with the reference symbol;
2. The visual code matches with the reference code and the visual symbol does not match with the reference symbol;
3. The visual code does not match with the reference code and the visual symbol matches with the reference symbol; and
4. The visual code does not match with the reference code and the visual symbol does not match with the reference symbol.

When the comparison result shows the first situation, it means the filter is the same model number with the required model number and it can work with the targeted air purifier, and it is made by Philips or its qualified manufacturer/supplier. Therefore, the App designed by Philips can obtain the property of the filter from the code itself, a website or database designated by Philips.

As a consequence, the action determined by the App from controlling the air purifier aspect may comprises switching on the apparatus or allowing the user to switch on the apparatus remotely from the App and adjusting the operation parameters according to the property of the new filter. For example, since the filter is new, and have very good filtration capability, the App may determine to decrease the air speed of the fan for keeping an acceptable air quality as well as prolonging the filter's life.

The action determined by the App from providing services aspect comprises providing services related to the disposable component including for example monitoring the lifetime of the filter and providing alert when the filter reaches its end of life because the App knows the property of the filter.

When the comparison result shows the second situation, it means the filter is the same model number with the required model number, but it is made by an unknown third party instead of Philips or its qualified suppliers. In this case, the App is not able to obtain the property of the filter made by an unknown third party, or even the App can get this information, it is not sure whether the information is trustable, therefore, the App may determine actions to control the apparatus, such as: preventing the air purifier from being switched on; or preventing the filter from being installed to the air purifier.

If the App allows the filter made by an unknown third party to be installed to the air purifier, the App may determine only provide services that are not related to the filter, for example the services will not include monitoring the status of the filter from the third party. In this case, the App still provide part of the services related to other information related to the air purifier.

When the comparison result shows the third and fourth situation, it means the filter is not the same model number with the required model number and it cannot work with the targeted air purifier. In these two cases, the App may provide a service to indicate the correct model number to the user. The App may prevent the user from installing the wrong filter to the air purifier and/or prevent the user from switching on the purifier. The App may determine to only provide a subset of services which does not comprise service related to the disposable component. Alternatively, the App may determine to not provide any service to the user until the user has changed a correct filter.

It is to be understood that FIG. 2 only shows one example of a system that can implement the method of the invention. The method of the invention may also be implemented in the apparatus itself without the need of a smartphone installed with an App. The apparatus may comprise a processor, a camera or any other visual code and visual symbol obtaining means and the apparatus may be installed with an application for implementing the steps described in this application. Then, the obtaining step 100, the comparing step 120 and 130 and the determining step 140 can be performed locally in the apparatus. The memory may be in the apparatus or any database that the apparatus can access.

Figure 4:
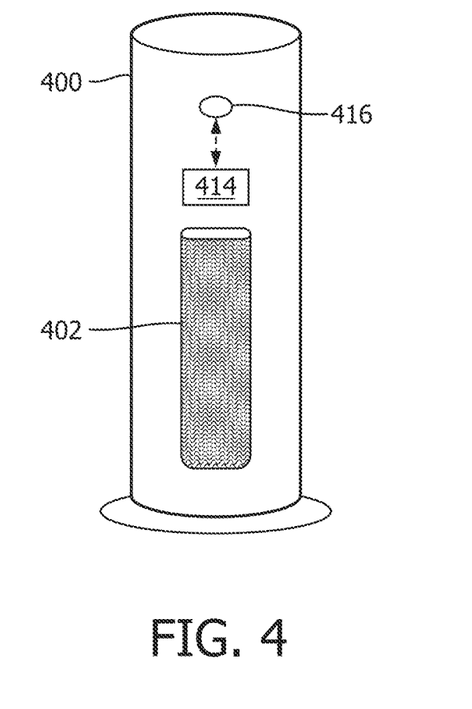
FIG. 4 shows an apparatus according to an embodiment of the invention.

As shown in FIG. 4, the apparatus 400 (an air purifier) comprises a disposable component (a filter 402). The apparatus 400 comprises a camera 416 for obtaining data representing a visual code and a visual symbol, wherein the visual code is selected from group of one-dimensional barcode, two-dimensional code, hologram. The apparatus 400 also comprises a processor 414 arranged for comparing the visual code with a reference code and comparing the visual symbol with a reference symbol, wherein the reference code indicates an identity of the disposable component, the reference symbol comprises a trademark or a copyright item. The processor 414 is further arranged to determine an action associated with the apparatus 400 in response to the two comparison results. The camera and/or the processor may be integrated into the apparatus as shown in the FIG. 4, either of it may be made as a separate accessories being connected with the apparatus 400 via a cable (not shown in the Figs).

According to an embodiment of the present invention, a software application is made for implementing the method described above. The software application is installed in a computer readable medium in the form of computer readable code for controlling a processor to carry out the methods as described above.

According to an embodiment of the present invention, a system for determining an action associated with an apparatus is provided. The system comprises a camera for obtaining data representing a visual code and a visual symbol and a processor arranged for comparing the visual code with a reference code and comparing the visual symbol with a reference symbol and determining the action in response to the comparison results. The system may be embedded in a smartphone or any other suitable handheld device, such as a tablet or laptop.

According to an embodiment of the present invention, a system for determining an action associated with an apparatus is provided. The system comprises:
means for obtaining data representing a visual code and a visual symbol;
means for comparing the visual code with a reference code and comparing the visual symbol with a reference symbol;
means for determining the action in response to the comparison results.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the scope of the technique approaches of the present invention, which will also fall into the protective scope of the claims of the present invention.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that an assembly of items of hardware or software or both carry out a function.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of determining an action associated with an apparatus, the apparatus having a disposable component, the method comprising:
    obtaining, by means of a camera, data representing a visual code and a visual symbol;
    comparing, by means of a processor, the visual code represented by said data with a reference code, the reference code indicating an identity of a disposable component of the apparatus, and comparing, by means of said processor, the visual symbol represented by said data with a reference symbol, to obtain comparison results; and
    determining the action in response to the comparison results,
    wherein the action to be taken in response to the comparison of the visual code with the reference code and the visual symbol with the reference symbol results in one of four unique actions as determined by the comparison results.

2. A method of determining the action according to claim 1, wherein the visual code is selected from the group of one-dimensional barcode, two-dimensional code, hologram.

3. A method of determining the action according to claim 1, wherein the reference symbol comprises any one of characters, words, pattern, image or the combination thereof.

4. A method of determining the action according to claim 1, wherein the reference symbol comprises any one of trademark or copyright item.

5. A method of determining the action according to claim 1, wherein the apparatus comprises any one of the following:
    an air purifier;
    a coffee machine;
    a respiratory drug delivery apparatus;
    a printer;
    a water purifier;
    a vacuum cleaner;
    a shaver;
    an electric toothbrush;
    an oxygen concentrator.

6. A method of determining the action according to claim 1, wherein the disposable component of the apparatus comprises any one of the following:
    filter of an air purifier;
    coffee powder pad of a coffee machine;
    drug to be delivered by a respiratory drug delivery apparatus;
    cartridge of a printer;
    filter of a water purifier;
    bag of a vacuum cleaner;
    shaving head of a shaver;
    toothbrush head of an electric toothbrush;
    filter of an oxygen concentrator.

7. A method of determining the action according to claim 1, wherein the action comprises at least one of the following:
controlling the apparatus;
providing services associated with the apparatus.

8. A method of determining the action according to claim 7, wherein when the visual code matches with the reference code and the visual symbol matches with the reference symbol,
the controlling the apparatus comprises at least one of:
switching on the apparatus;
adjusting operation parameters according to a property of the disposable component; and
the providing services comprises providing service related to the disposable component.

9. A method of determining the action according to claim 7, wherein when the visual code matches with the reference code and the visual symbol does not match with the reference symbol,
the controlling the apparatus comprises at least one of:
preventing the apparatus from being switched on;
preventing the component of the apparatus from being installed to the apparatus; and
the providing services comprises providing a subset of services which does not comprise any service related to the disposable component.

10. A method of determining the action according to claim 7, wherein when the visual code does not match with the reference code,
the controlling the apparatus comprises at least one of:
preventing the apparatus from being switched on;
preventing the component of the apparatus from being installed to the apparatus; and
the providing services comprises at least one of:
indicating a correct identity of the disposable component;
providing a subset of services which does not comprise service related to the disposable component.

11. A method of determining an action according to claim 8, wherein the service related to the disposable component comprises at least one of the following:
registering the disposable component on an application;
monitoring the working status of the disposable component;
indicating working status of the disposable component;
indicating property of the disposable component;
indicating maintenance requirement of the disposable component.

12. A computer readable medium carrying computer readable code for controlling a processor to carry out any one of the method of claim 1.

13. An apparatus having a disposable component comprising:
a camera for obtaining data representing a visual code and a visual symbol; and
a processor arranged for comparing the visual code represented by said data with a reference code, the reference code indicating an identity of a disposable component of the apparatus, and comparing the visual symbol represented by said data with a reference symbol, to obtain comparison results, and to determine an action associated with the apparatus in response to the comparison results,
wherein the action to be taken in response to the comparison of the visual code with the reference code and the visual symbol with the reference symbol results in one of four unique actions as determined by the comparison results.

14. A system for determining an action associated with an apparatus having a disposable component, the system comprising:
means for obtaining data representing a visual code and a visual symbol;
means for comparing the visual code represented by said data with a reference code, the reference code indicating an identity of a disposable component of the apparatus, and comparing the visual symbol represented by said data with a reference symbol, to obtain comparison results; and
means for determining the action in response to the comparison results,
wherein the action to be taken in response to the comparison of the visual code with the reference code and the visual symbol with the reference symbol results in one of four unique actions as determined by the comparison results.

15. A method of determining the action according to claim 1,
wherein in a first case where the visual code matches the reference code and the visual symbol matches the reference symbol, said action comprises at least one of: switching on the apparatus, allowing a user to switch on the apparatus remotely, adjusting operational parameters of the apparatus according to a property of the disposable component,
wherein in a second case where the visual code matches the reference code and the visual symbol does not match the reference symbol, said action comprises at least one of: preventing the disposable element from being switched on, prevent the disposable element from being installed to the apparatus, allowing the disposable element from being installed and only providing certain limited services unrelated to the disposable element,
wherein in a third case where the visual code does not match the reference code and the visual symbol matches the reference symbol, said action comprises at least one of: providing a service to indicate a correct model number to the user, prevent the user from installing the wrong disposable component, prevent the user from switching on the disposable component, and
wherein in a fourth case where the visual code does not match the reference code and the visual symbol does not match the reference symbol, said action comprises at least one of:
providing a service to indicate a correct model number to the user, prevent the user from installing the wrong disposable component, prevent the user from switching on the disposable component.

16. A method of determining the action according to claim 1, wherein a size of the visual symbol is compared with a size of the reference symbol.

17. A method of determining the action according to claim 1, wherein a relative location between the visual code and the visual symbol is compared with a relative location between the reference code and the reference symbol.

18. An apparatus according to claim 13, wherein a size of the visual symbol is compared with a size of the reference symbol.

19. An apparatus according to claim 13, wherein a relative location between the visual code and the visual symbol is compared with a relative location between the reference code and the reference symbol.

20. A system according to claim 14, wherein a size of the visual symbol is compared with a size of the reference symbol.

21. A system according to claim 14, wherein a relative location between the visual code and the visual symbol is compared with a relative location between the reference code and the reference symbol.

\* \* \* \* \*